United States Patent [19]

Fremont et al.

[11] 4,056,342

[45] Nov. 1, 1977

[54] FIBERBOARD MANUFACTURE

[75] Inventors: Henry A. Fremont, Wyoming; Walter Phalti Lawrence, Hamilton, both of Ohio

[73] Assignee: Champion International Corporation, Stamford, Conn.

[21] Appl. No.: 676,715

[22] Filed: Apr. 14, 1976

Related U.S. Application Data

[62] Division of Ser. No. 380,334, July 18, 1973, Pat. No. 3,969,459.

[51] Int. Cl.[2] .................. B29J 5/00

[52] U.S. Cl. .................. 425/80; 425/324.1; 425/223; 425/404; 425/DIG. 201

[58] Field of Search .................. 425/80-83, 425/317, 324 R, 223, 404, 445, DIG. 201

[56] References Cited

U.S. PATENT DOCUMENTS

| | | | |
|---|---|---|---|
| 1,862,318 | 6/1932 | Ruby | 425/81 |
| 2,356,826 | 8/1944 | Coss et al. | 425/83 |
| 2,457,784 | 12/1948 | Slayter | 425/80 X |
| 2,546,266 | 3/1951 | Kropp | 425/83 |
| 2,997,096 | 8/1961 | Morrison et al. | 425/83 X |
| 3,230,287 | 1/1966 | Caron et al. | 425/83 X |

*Primary Examiner*—Robert L. Spicer, Jr.
*Attorney, Agent, or Firm*—Pennie & Edmonds

[57] ABSTRACT

This invention relates to an improved process and apparatus system for the continuous production of thin fiberboard products wherein a binder-impregnated wood fiber mat is continuously formed and then continuously and successively passed through a conditioning zone where the mat temperature is adjusted to about the glass transition temperature of the ligneous hemicellulosic matrix material of the wood fiber at a moisture content from about 6% to 12% by weight, prepressed to reduce the bulk thereof and substantially eliminate entrained air therefrom, hot pressed at a temperature and for a time sufficient to reduce the mat to the final thickness desired and to initiate but not to complete cure of the binder, and thereafter subjected to a temperature sufficient, but not above about 350° F., and for a time sufficient to complete binder cure and mat consolidation.

1 Claim, 1 Drawing Figure

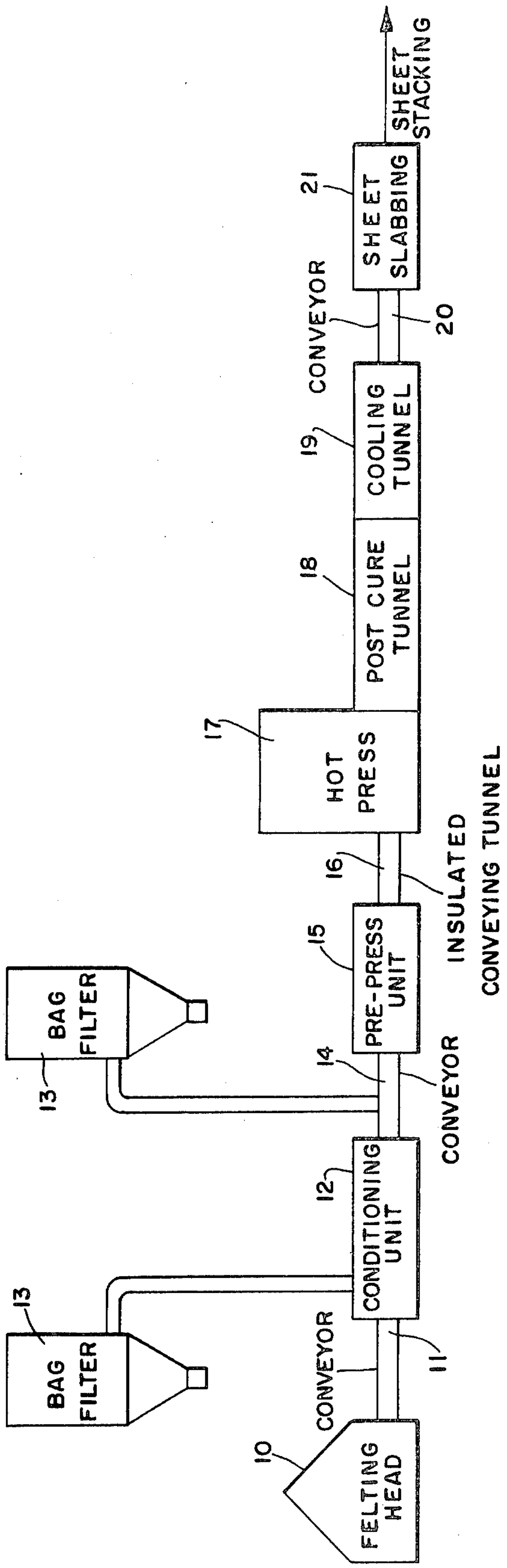
FELTING HEAD
10
CONVEYOR
11
BAG FILTER
13
CONDITIONING UNIT
12
CONVEYOR
14
BAG FILTER
13
PRE-PRESS UNIT
15
16
INSULATED CONVEYING TUNNEL
HOT PRESS
17
POST CURE TUNNEL
18
COOLING TUNNEL
19
CONVEYOR
20
SHEET SLABBING
21
SHEET STACKING

FIBERBOARD MANUFACTURE

This is a division, of application Ser. No. 380,334, filed July 18, 1973, now U.S. Pat. No. 3,969,459.

BACKGROUND OF THE INVENTION

Presently, fiberboards and sheets are made utilizing stationary platen presses which operate intermittently. While generally satisfactory for thick fiberboard products, about 0.125 to 0.75 inch in thickness, such intermittent procedure is not economically practical for the manufacture of thin fiberboard products, i.e., those having a thickness of about 0.009 to 0.16 inch. The reasons for this are that intermittent type presses involve irreducible periods of time for opening and closing and as the weight per unit area of the board product decreases as its thickness is reduced, the operating costs per unit weight become prohibitively high. While continuous type presses exist, attempts to use them have not been successful for thin fiberboards since it was not possible to get the proper cure and thickness as well as strength of product with any commercially suitable dwell time in the press. Such presses require that the cure must take place in a period of seconds. Thus, the economic and commercial advantages inherent in continuous operation have thus far not been usable for the manufacture of thin fiberboards or sheets, i.e., those thinner than 0.16 inch.

SUMMARY OF THE INVENTION

The instant invention provides a continuous process and apparatus system for producing fiberboard or sheets having a final thickness of less than 0.16 inch thereby realizing the advantages of continuous production as opposed to conventional intermittent operation.

Briefly stated, the present invention comprises both a novel process and an apparatus system. The process comprises continuously forming a binder-impregnated wood fiber mat and thereafter continuously treating the mat until final binder cure and consolidation are effected. Such treatment comprises passing said binder-impregnated fiber mat into a conditioning zone where the mat temperature is adjusted to about the glass transition temperature of the ligneous hemicellulosic matrix material of the wood fiber at a moisture content of the mat from about 6% to 12% by weight, prepressing the mat to reduce the bulk and substantially eliminate entrained air therefrom, hot pressing the prepressed mat at a temperature and for a time sufficient to reduce the mat to the final thickness desired and to partially cure the binder, and thereafter subjecting the mat to a temperature sufficient, but not above about 350° F., and for a time sufficient to complete binder cure and mat consolidation. The apparatus system comprises means for continuously forming a binder-impregnated fiber mat, means for continuously adjusting the mat temperature to from about the glass transition temperature noted at a moisture content to from about 6% to 12% by weight, means for continuously prepressing the mat to reduce the bulk thereof and substantially eliminate entrained air therefrom, hot press means for continuously reducing the mat to the final thickness desired and to partially cure the binder, post cure means for continuously effecting complete cure of the resin, and means for continuously conveying the fiber mat through said system.

BRIEF DESCRIPTION OF THE DRAWING

The FIGURE is a schematic view of the apparatus system of the instant invention.

DETAILED DESCRIPTION OF THE INVENTION

The instant invention will be described in connection with the manufacture of fiberboards and sheets from wood fibers, although it will be understood that in place of the wood fibers it would be possible to utilize other organic as well as inorganic fibers or mixtures thereof such as wool, cotton, glass fibers, rayon, nylon, and the like. The wood fiber used is preferably pine wood fiber obtained from pine chips by the conventional process of defiberizing the chips in a double disc mill in an atmosphere of steam at elevated temperatures and pressures. Moreover, as used herein, the term "fiberboard product" is intended to mean fiberboards, fiber sheets, and the like having a thickness less than about 0.16 inch.

The process of the instant invention comprises first forming a fiber mat impregnated with a resin. A number of known techniques can be used for this purpose, but it is preferred to use conventional air felting apparatus 10 to form a mat having the desired weight per square foot and desired degree of resin impregnation. The resin used for binding is preferably a thermosetting phenol-formaldehyde resin of the type now used for this purpose. The proportions of resin used are those ordinarily used, i.e., about 5% to 10% by weight. However, the resins used for binding and the proportions thereof are not critical in the instant process and can be varied dependent upon the characteristics, such as strength, desired in the final product.

As the fiber mat is being continuously formed, it is continuously conveyed by conveyor 11 to conditioning apparatus 12 where the mat temperature is adjusted to from about 180° F. to 210° F. and the moisture content thereof from about 6% to 12%. Commercially available devices for adjusting temperature and moisture contents of mats are commercially available and known as "through dryers." Adjustment of the mat temperature and moisture is usually accomplished in such apparatus by the use of a flow of hot, moist air through the mat. The air temperature and moisture are, of course, adjusted to give the heat and moisture needed to bring the mat within the ambits noted. Filter means 13 are provided to remove any fibers carried by the circulating air. It is essential to the instant process that such conditioning take place before precompressing. The temperature noted is the glass transition temperature at 6% to 12% moisture of the ligneous hemicellulosic material of the wood. Such temperature must be attained in order to render the ligneous material plastic.

The continuously moving mat is then moved from the conditioning unit and conveyed by conveyor 14 to a conventional continuous prepress 15 of the type presently available where it is prepressed while at a temperature and moisture content within the range achieved by conditioning. A suitable type of press is one using pressure rolls which can exert a pressure of 200 to 1,000 psi at roll nip. The prepressing does not form the fiberboard into the final thickness desired, but to a thickness ordinarily about 1 ½ to 2 times larger than that desired of the final product. Of importance, however, is the fact that prepressing of the conditioned mat results in elimination of "springback" or reversion to the original bulky condition that occurs when unconditioned mats are prepressed. In addition to compacting the mat to permit a more rapid hot press, the prepressing eliminates entrained air from the mat thus avoiding the undesired formation of voids in the final product. The press time will vary inversely with the pressure used and is dependent upon the binder content and moisture content of the mat. By way of illustration, a precompression of 5 to 30 seconds is used with 400 psi on fiberboard having a binder content of 5% and a moisture content of 6%. Optimum conditions for prepressing are readily determined by making test runs with test panels and determining those conditions within the ranges noted giving a prepressed panel which has no, or minimal, springback. By having the ligneous material in a plastic condition, the prepressing will cause the encased fiber to be "straightened out" due to ligneous material flow and not to bounce back once pressure is stopped.

After such precompression, the mat is continuously conveyed to a continuous hot press 17, preferably by a conveyor in an insulated tunnel 16. Such presses, such as the "Lam-N-Hard" press, are presently commercially available. The continuous pressing is accomplished by passing the prepressed fiberboard between smooth metal continuous belts heated externally to temperatures in the range of about 350° F. to 550° F. Ordinarily, pressure of about 200 to 400 psi are used with a maximum pressure being about 500 psi. The operating speed of the press can be varied between about 50 feet per minute (fpm) to 300 feet per minute depending upon the density, degree of cure desired, and thickness of the fiberboard. Ordinarily, press times from about 2 to about 10 seconds are preferred and the particular temperature will depend upon the binder resin used and thickness of the mat.

It has been surprisingly found that complete curing need not be effected in the press and, in fact, the greatest strength of the finished product is obtained when the binder resin is not completely cured in the hot press but in the postcuring apparatus as described below.

With very thin fiberboard, however, no postcuring may be needed since sufficient heat has penetrated to the center of the mat during pressing to effect a cure. In addition, prepressing can be eliminated with very thin sheets since there is no need to change the openings in the press and the temperature thereof can readily "plasticize" the ligneous material.

Such postcuring is accomplished by continuously conveying the consolidated fiber product from the hot press 17 into the postcure apparatus 18 which is preferably a tunnel having conveying means therein as well as means for maintaining an elevated temperature in the tunnel, ordinarily, a temperature sufficient to cure but below about 350° F.; preferably, from about 250° F. to about 300° F. As the consolidated fiber product is conveyed through the postcuring tunnel, the temperature therein is sufficient to effect a final cure of the resin. It has also been found that this additional heat treatment does not in any way alter the physical dimensions of the mat from those obtained in the hot press. Within the temperature limits noted, the postcure time varies from about 30 seconds to about 5 minutes dependent upon the resin used, thickness of the mat, and degree of the resin cure in the initial hot pressing step.

From the postcuring unit, the board is cooled, as in tunnel 19, conveyed by conveyor 20, to conventional apparatus 21 of the type now used for trimming, cutting and finally stacking.

The operative and optimum processing conditions for each stage of the process have been discussed and are readily determined for each particular fiberboard product by first making test runs with test panels before commercial runs are made.

It is critical in the instant process that the conditioning and two-stage curing be utilized in order that the process can be successfully carried out on a continuous basis.

The apparatus assembly has been largely described in connection with the process and, where deemed necessary, reference has been made to commercially available equipment. While the certain individual units of applicants' assembly are known, they have not heretofore been utilized in combination as presently claimed. The result is the ability to make thin fiberboard products on a continuous basis. Moreover, by utilizing a continuous process and one in which there is no need to complete resin cure in the hot press, the hot press used can be of a shorter length than that required for equipment needed for complete cure of the resin in the hot press. This greatly lowers the initial capital cost for a hot press.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

I claim:

1. Apparatus system for the manufacture of fiberboard products having a final thickness of no more than about 0.16 inches on a continuous basis comprising, in combination:

a. felting means for continuously forming a binder-impregnated wood fiber mat;

b. conditioning means for adjusting the temperature of the mat to about the glass transition temperature of the ligneous hemicellulosic matrix material of wood at a moisture content of the mat from about 6% to 12%;

c. prepress means for pressing the mat as conditioned to reduce permanently the thickness of the mat and substantially eliminate entrained air therefrom;

d. hot press means for reducing further the thickness of the mat to the final thickness desired and partially curing the binder;

e. heated tunnel means within which complete cure of the binder is effected; and f. conveying means for conveying the mat as it is continuously formed away from said felting means whereby said mat from its leading end is sequentially treated thereby to form said fiberboard products.

* * * * *